United States Patent
Bassett et al.

(10) Patent No.: US 7,834,600 B2
(45) Date of Patent: Nov. 16, 2010

(54) REGULATED POWER SUPPLY SYSTEM AND AN OPERATING METHOD THEREFORE

(75) Inventors: Keith Nelson Bassett, Grass Valley, CA (US); Ralph Edward Anderson, Nevada City, CA (US); Samuel H. Nork, Andover, MA (US)

(73) Assignee: Linear Technology Corporation, Milpitas, CA (US)

( * ) Notice: Subject to any disclaimer, the term of this patent is extended or adjusted under 35 U.S.C. 154(b) by 473 days.

(21) Appl. No.: 12/000,595

(22) Filed: Dec. 14, 2007

(65) Prior Publication Data

US 2008/0143307 A1   Jun. 19, 2008

Related U.S. Application Data

(60) Provisional application No. 60/874,742, filed on Dec. 14, 2006.

(51) Int. Cl.
G05F 1/00 (2006.01)
(52) U.S. Cl. ..................................................... 323/265
(58) Field of Classification Search ................. 323/222, 323/265, 279, 282
See application file for complete search history.

(56) References Cited

U.S. PATENT DOCUMENTS

| | | | | |
|---|---|---|---|---|
| 5,229,661 A | * | 7/1993 | Webb | 326/18 |
| RE37,708 E | * | 5/2002 | Danstrom | 323/284 |
| 6,465,994 B1 | * | 10/2002 | Xi | 323/274 |
| 6,541,946 B1 | * | 4/2003 | Chen et al. | 323/280 |
| 6,580,257 B2 | * | 6/2003 | Marty | 323/280 |
| 7,486,058 B2 | * | 2/2009 | Szepesi | 323/272 |
| 7,573,251 B2 | * | 8/2009 | Yang et al. | 323/303 |

* cited by examiner

*Primary Examiner*—Adolf Berhane
*Assistant Examiner*—Yemane Mehari
(74) *Attorney, Agent, or Firm*—McDermott Will & Emery LLP

(57) ABSTRACT

A power supply system includes a regulator for receiving an input voltage and producing an output voltage, the regulator including an output device and a controller coupled to the regulator. The controller is configured to monitor at least one operating parameter of the output device and, in response, generate a control signal that adjusts the input voltage to a minimum input voltage needed to maintain the output device in saturation regardless of variation in the monitored operating parameter.

57 Claims, 9 Drawing Sheets

REGULATED POWER SUPPLY SYSTEM AND AN OPERATING METHOD THEREFORE

RELATED APPLICATION

This application claims priority to U.S. Provisional Patent Application No. 60/874,742, filed on Dec. 14, 2006 and titled "AUTO-BIAS SYSTEM AND METHODOLOGY FOR REGULATORS." The entire content of the prior application is incorporated herein by reference.

TECHNICAL FIELD

The subject matter of this disclosure relates to power supply systems and more particularly to regulated power supply systems and operating methodologies.

BACKGROUND

Today's complex electronic products require a wide variety of integrated circuits to perform their functions. These integrated circuits are in turn powered from a wide variety of input power sources. Most often, the input power source available is not of the requisite voltage for each individual integrated circuit ("IC") within a given electronic product, particularly over time. For example, a current LiIon battery may have a full charge voltage of 4v and an end-of-life voltage of 2.7v, while many of today's ICs require a constant voltage of 2.5v or less. The challenge then exists as to how to develop the required voltages in an efficient manner. Several switching regulator topologies have been developed to accomplish just this task.

In one example, a switching regulator, such as, for example, a buck regulator is employed as a means to reduce an input power source voltage to a voltage more readily usable by ICs. The drawback to the buck regulator topology however, as well as the other switching topologies, is that the output voltage exhibits switching noise. This noise represents a voltage variation seen by the ICs being driven by this type of regulator.

When the noise from a switching regulator topology is deemed unacceptable in a given system, a linear regulator, such as a low dropout regulator ("LDO"), is generally used to develop the required voltage from an input source voltage. These regulator topologies provide a clean output voltage due in large part to their high degree of isolation between their input voltage source and their generated output voltage. However, these regulators have relatively poor efficiency, especially when the difference in voltage between an input power source and required output voltage is large.

In order to provide a clean output voltage from an input power source with reasonable efficiency, a combination of switching regulators and linear regulators are used. FIG. 1 illustrates a conventional buck-LDO system 100 that uses a buck regulator to reduce a voltage difference between a received input voltage and a produced output voltage of the LDO, thereby increasing the efficiency of the LDO.

The buck-LDO system 100 includes a buck regulator 102 and a LDO 104. The buck regulator includes an input voltage node 102a and an output voltage node 102b and is configured to provide the bulk of the voltage reduction from the input power source coupled to input voltage node 102a. The reduced voltage is produced at the output voltage node 102b and is supplied to LDO 104.

The LDO 104 is configured to develop the desired clean output voltage from the input voltage produced by buck regulator 102. To this end, LDO 104 includes a field-effect-transistor ("FET") output device 104a having an input node 104b and an output node 104c. The input node 104b is configured to receive the reduced voltage produced by buck regulator 102 and to provide the reduced voltage to FET output device 104a. The FET output device 104a then produces the desired clean output voltage at output node 104c.

In this scenario, the relatively noisy voltage provided to LDO 104, via buck regulator 102, does not affect output voltage produced by LDO 104 because LDO 104 provides a high degree of isolation between the received input voltage and produced output voltage. The degree of isolation, in one implementation, describes a degree of independency of the produced output voltage from the variations in the received input voltage.

Moving forward, in this scenario, the efficiency loss of LDO 104 is reduced as compared to LDO 104 only system since the input voltage supplied to LDO 104, via input node 104a, is not directly from the input power source (input node 102a) but rather from buck regulator 102 producing a reduced input voltage. While buck-LDO system 100 may be able to produce a clean output voltage not available with the buck only topology at an improved efficiency over the LDO only topology, it does not represent a system capable of operating at maximum efficiency for a given level of isolation and thus output voltage noise.

The inability of this system to achieve maximum efficiency for a given degree of isolation is due to the fixed input voltage provided to LDO 104 from buck regulator 102. For an LDO with a FET output device (e.g., FET output device 104a), isolation generally improves, albeit with diminishing returns, the farther into saturation the FET output device is operated.

It is important to note that the farther into saturation the FET output device 104a is operated, the greater the efficiency loss of LDO 104. It is also important to note that as FET output device 104a falls out of saturation, the isolation falls very rapidly, eventually passing any variation at the input voltage node directly into the output voltage node.

Accordingly, in the conventional buck-LDO system 100, output voltage produced by buck regulator 102 is chosen such that, under worst case load currents, output voltage levels, temperature extremes, and process variation, FET output device 104a remains saturated at a level that ensures adequate isolation. This necessarily means that, at all other conditions of load currents, output voltage levels, temperatures, or process variations, FET output device 104a will be operating at a sub-maximum efficiency point for a given degree of isolation.

Accordingly, there is need for a power supply system that adaptively alters the input supply bias of a regulator (e.g., LDO) to ensure optimum efficiency for a given degree of isolation. In particular there is a need for a power supply system that monitors operating parameters of a regulator (e.g., LDO) and based on the monitored operating parameters adjusts the input voltage received by the output device of the regulator so as to support its operation at a point that provides maximum efficiency for a given degree of isolation regardless of changes to a load current, an output voltage, a temperature, or a process variation.

SUMMARY

In one general aspect, a power supply system, as described herein, includes a regulator for receiving an input voltage and producing an output voltage, the regulator including an output device and a controller coupled to the regulator and configured to monitor at least one operating parameter of the output device and, in response, generate a control signal that adjusts the input voltage to a minimum input voltage needed to maintain the output device in saturation regardless of variation in the monitored operating parameter.

Implementations of the above general aspect may include one or more of the following features. For example, the output device may include a field-effect transistor ("FET") including a drain, a gate, and a source. In one implementation, the regulator includes a linear regulator. The linear regulator may include a low dropout regulator.

The controller may include an adaptive feedback generator configured to control, via a feedback signal, the input voltage applied to the output device. The adaptive feedback generator may include an estimating circuit configured to estimate a threshold voltage associated with the FET and an operational amplifier configured to aggregate the estimated threshold voltage associated with the FET and a reference voltage associated with the feedback generator and to produce the feedback signal that controls the input voltage received by the output device.

Along these lines, the power supply system may further include a driving regulator coupled to the regulator and the adaptive feedback generator. The driving regulator may be configured to be responsive to the feedback generator in providing the input voltage to the output device. The driving regulator may be configured to be responsive to the feedback signal. The driving regulator may include a switching regulator, such as, for example, a buck regulator, configured to provide voltage reduction from an input power source.

As noted-above, the feedback generator may include an estimation circuit. The estimation circuit may include a semiconductor device, and the estimation circuit may be configured to estimate a voltage at the output device based on an output signal of the semiconductor device. The voltage may include an estimation of the threshold voltage of the output device.

The estimation circuit may further include a feedback circuit coupled to the output signal of the semiconductor device. The feedback circuit may be configured to reduce variations in the estimated threshold voltage of the output device. To this end, in one implementation, the feedback circuit may include an operational amplifier having a first input for receiving a signal corresponding to effects that influence the semiconductor device, a second input for receiving a reference signal, and an output for controlling the output signal of the semiconductor device.

In another implementation, the feedback generator may include an estimation circuit that includes a first circuit including a first combination of semiconductor devices and a second circuit including a second combination of semiconductor devices, the estimation circuit configured to estimate a threshold voltage of the output device. To this end, the first circuit may be configured to produce a first output signal and the second circuit may be configured to produce a second output signal, wherein the difference between the first output signal and the second output signal corresponds to the threshold voltage of the output device.

In another general aspect, a method for supplying power, as described herein, includes monitoring at least one operating parameter of a regulator coupled to a controller and configured to receive an input voltage and produce an output voltage, calculating, based on the monitored operating parameter, a minimum value of the input voltage required for operating the regulator in saturation, and adjusting the input voltage of the regulator to the calculated minimum value in order to maintain the regulator in saturation regardless of variation in the monitored operating parameter.

Implementations of the above general aspect may include one or more of the following features. The regulator may include a linear regulator. The linear regulator may include a low dropout regulator. The regulator may further include an output device, such as, for example, a field-effect transistor ("FET") including a drain, a gate, and a source.

Monitoring the at least one operating parameter may include monitoring a threshold voltage ("$V_t$") of the FET and/or a gate-to-source voltage ("$V_{gs}$") of the FET. Monitoring $V_t$ and/or $V_{gs}$ may include tracking variation of $V_t$ and/or $V_{gs}$ due to temperature, process variation, output voltage or load current of the FET.

Calculating the minimum value of the input voltage required for operating the regulator in saturation may include aggregating $V_t$ and $V_{gs}$ to determine the minimum value of the input voltage. Aggregating $V_t$ and $V_{gs}$ may include subtracting $V_t$ from $V_{gs}$ to determine the minimum value of drain-to-source voltage ("$V_{ds}$").

Adjusting the input voltage of the regulator may include generating a control signal and submitting the control signal to a driving regulator configured to produce the input voltage having the calculated minimum value. The driving regulator may be coupled to the linear regulator and may include a switching regulator configured to provide voltage reduction from an input power source.

In another general aspect, a controller, as described herein, is coupled to a regulator having an output device, and configured to monitor at least one operating parameter of the output device and, in response, provide a control signal for controlling an input voltage received by the output device. The controller includes a multiplexer configured to generate a programmable reference voltage, an estimation circuit configured to estimate a threshold voltage of the output device superimposed on a source voltage of the output device, and an operational amplifier. The operational amplifier is configured to receive, at one input, the programmable reference voltage from the multiplexer and the estimated threshold voltage from the estimation circuit, receive, at another input, the source voltage and the gate voltage of the output device, aggregate the voltages received at its inputs, and generate a control signal to adjust the input voltage to a minimum input voltage needed to maintain the output device in saturation regardless of variations in operating parameters of the output device.

The details of one or more implementations are set forth in the accompanying drawings and the description below. Other features will be apparent from the description and drawings, and from the claims.

DETAILED DESCRIPTION

Figure 1:
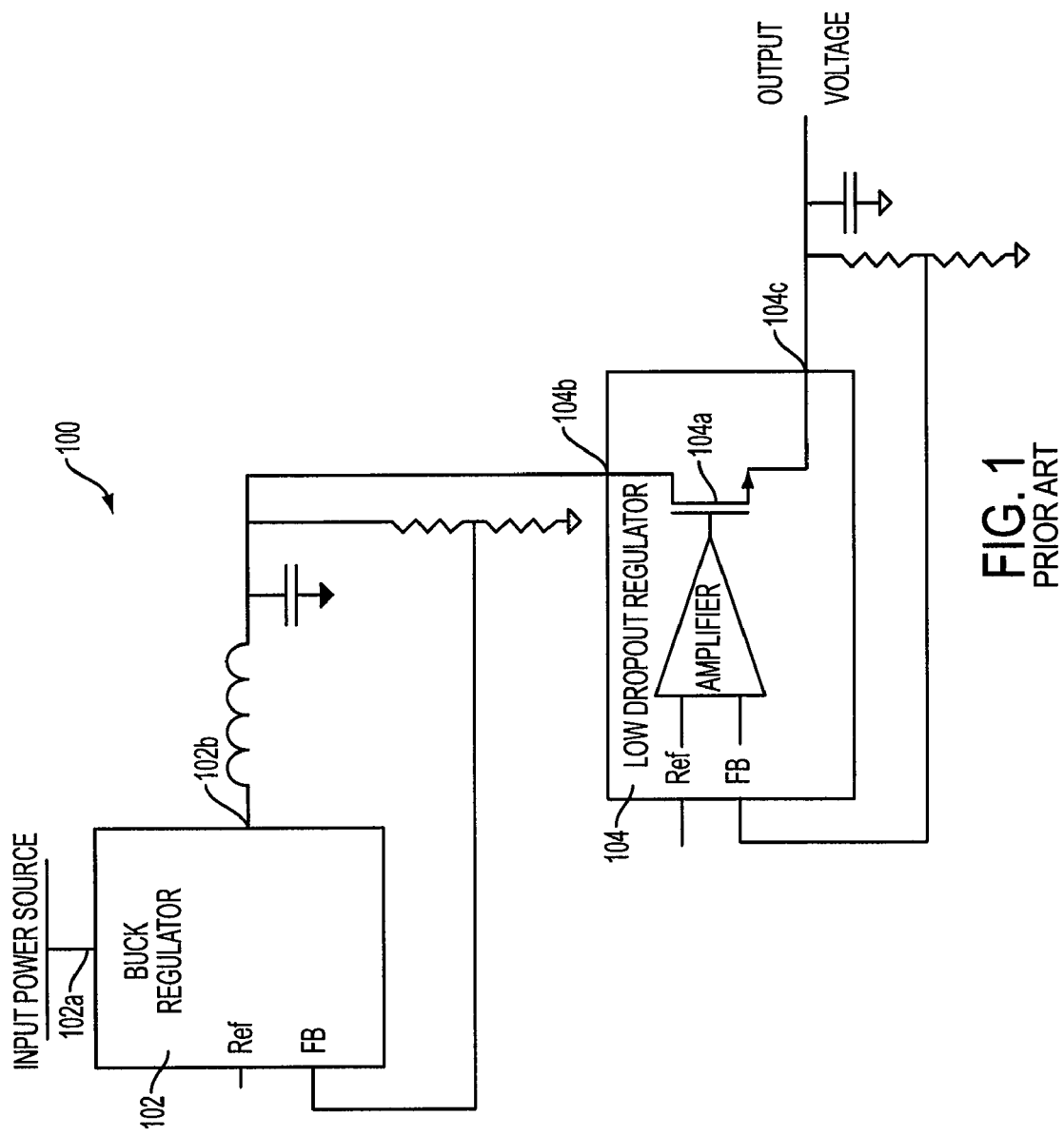
FIG. 1 illustrates a conventional buck-LDO system that uses a buck regulator to reduce a voltage difference between a received input voltage and a produced output voltage of the LDO, thereby increasing the efficiency of the LDO.

The concepts described herein, in one aspect, relate to a power supply system including a regulator (e.g., LDO) and a controller for controlling an input voltage received by the regulator (e.g., LDO). To this end, the regulator includes a FET output device, which is configured to receive an input voltage and to produce an output voltage. The controller is coupled to the regulator and configured to monitor operating parameters (e.g., a threshold voltage and/or a gate-to-source voltage) of the output device and, in response, generate a control signal that adjusts the input voltage received by the FET output device to a minimum input voltage needed to maintain the FET output device in saturation regardless of variation in the monitored operating parameters.

The input voltage needed to maintain the FET output device in saturation may be set in a manner such that isolation between the input and output of the regulator is optimized. This may result in an increase in the input voltage supplied to the regulator, thereby reducing the efficiency to some extent. The power supply system described herein, in one implementation, is devised such that an optimum tradeoff between efficiency and isolation is achieved.

As a preliminary matter, it should be noted that for a regulator (e.g., LDO) having a FET output device, the efficiency is directly proportional to the voltage appearing across the FET output device. It should also be noted that the isolation between received input voltage and the produced output voltage improves, albeit with diminishing returns, the deeper into saturation the FET output device is operated.

Placing the FET output device deeper into saturation, however, requires a greater voltage to appear across the FET output device. Thus, for greater isolation, efficiency generally degrades. If the FET output device is allowed to fall out of saturation, the isolation falls very rapidly, eventually passing any variation at its input voltage directly into the output voltage (i.e. no isolation).

The saturation operating region for the FET output device is generally defined as follows:

$$V_{ds} >= V_{gs} - V_t \text{ and } V_{gs} > V_t \quad \text{(Equation 1)}$$

where, $V_{ds}$ represents a drain-to-source voltage of the FET output device (i.e., voltage across the FET output device), $V_{gs}$ represents a gate-to-source voltage of the FET output device, and $V_t$ is a threshold voltage of the FET output device. The requirement $V_{gs} > V_t$ simply inverts the channel of the FET output device and thus is analogous to turning the FET output device "on" for normal operation.

The efficiency versus isolation trade may be seen from Equation 1. The greater $V_{ds}$ beyond $V_{gs} - V_t$ the further into saturation the FET output device is operated, while at the same time the greater the $V_{ds}$, the greater the voltage appearing across the FET output device and thus the greater the efficiency loss.

The FET output device threshold voltage $V_t$ changes over output voltage, temperature, and process variations. Similarly, $V_{gs}$ also varies over output voltage, temperature, and process variations and further, $V_{gs}$ also varies with load current. Thus, from Equation 1 it may be seen that to maintain optimum efficiency for a given degree of isolation, $V_{ds}$ should be able to track $V_{gs}$ and $V_t$ to maintain a particular level of $V_{ds} >= V_{gs} - V_t$ and thus isolation.

Choosing a fixed $V_{ds}$ in operating the regulator, as done in the conventional power supply system (e.g., buck-regulator system 100 illustrated by FIG. 1), such that $V_{ds}$ is always $>= V_{gs} - V_t$ under various operating conditions may guarantee a minimum desired isolation, but as the load current, output voltage, temperature, or process varies (i.e. values for $V_{gs}$ and $V_t$ vary) the $V_{ds}$ will be greater than the necessary $V_{ds}$ to maintain the desired isolation and thus the system will be less than maximally efficient.

The power supply system described herein, in one implementation, monitors operating parameters (e.g., $V_{gs}$ and $V_t$) of the FET output device and based on the monitored operating parameters adjusts the input voltage received by the FET output device so as to support its operation at a point that provides maximum efficiency for a given degree of isolation regardless of changes to a load current, an output voltage, a temperature, or a process variation. In this manner, the power supply system described herein, unlike the conventional power supply system, avoids using a fixed $V_{ds}$.

Figure 2:
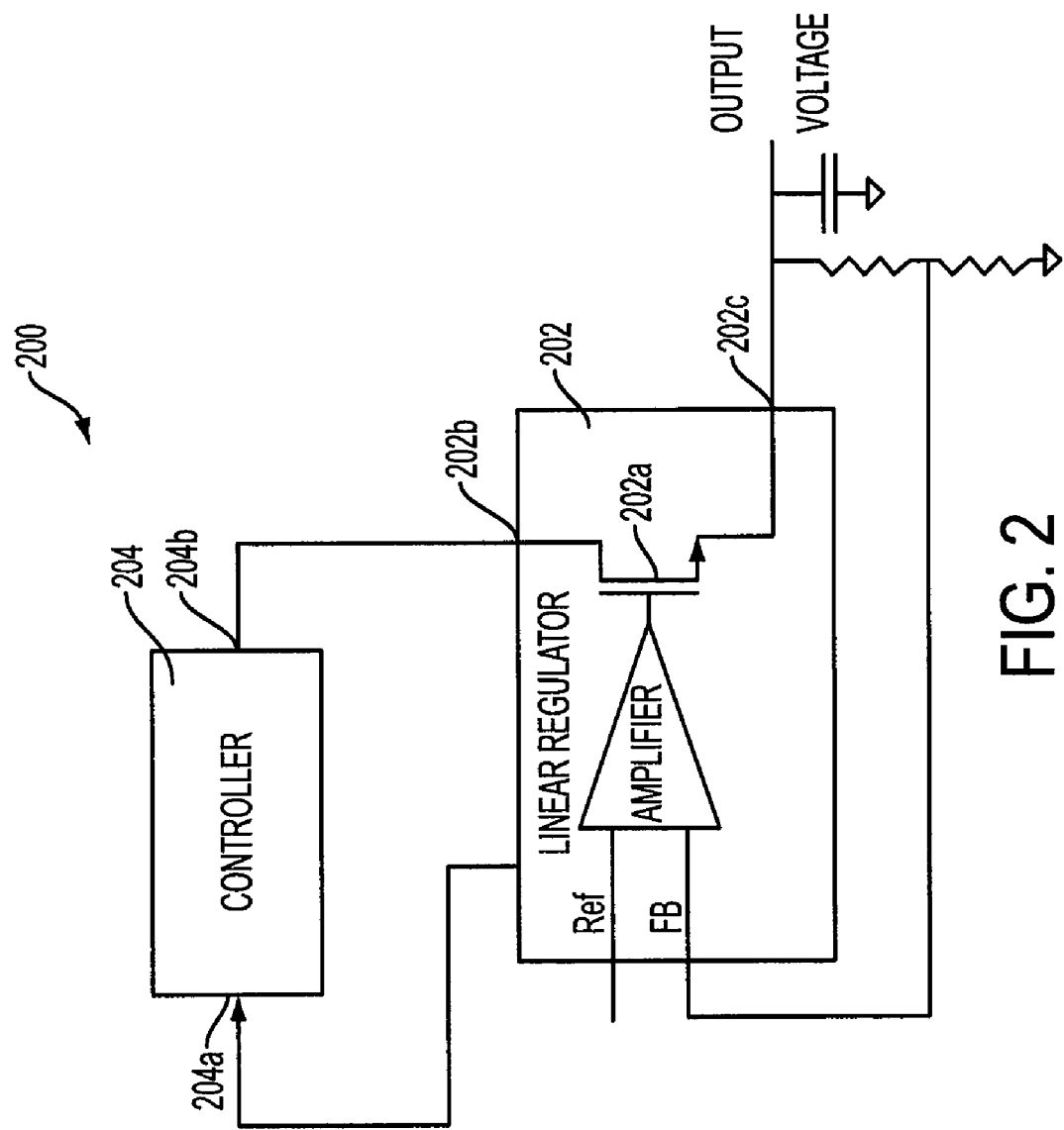
FIGS. 2-4 illustrate various implementations of a power supply system according to the present disclosure.
Figure 3:
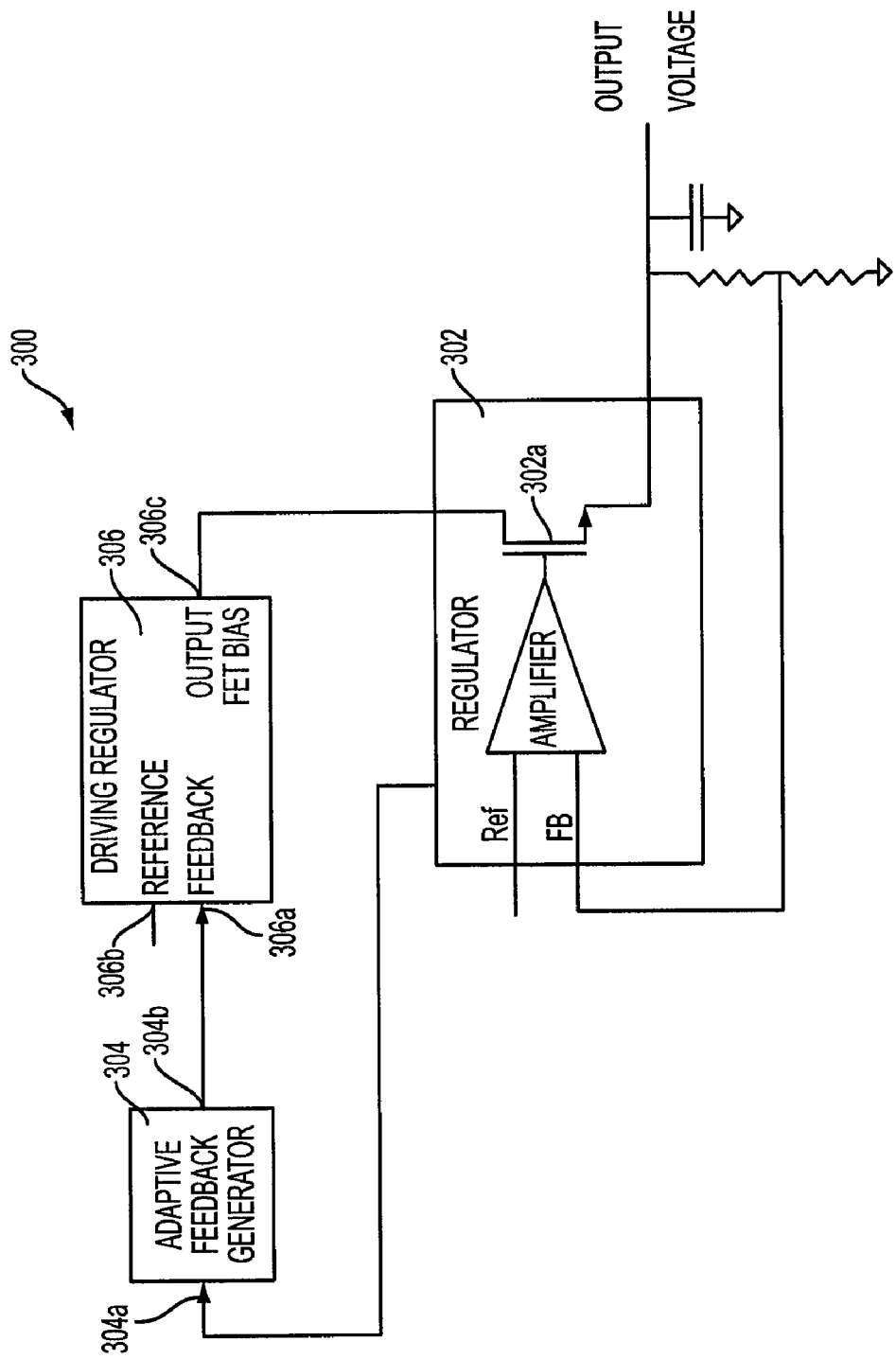
Figure 4:
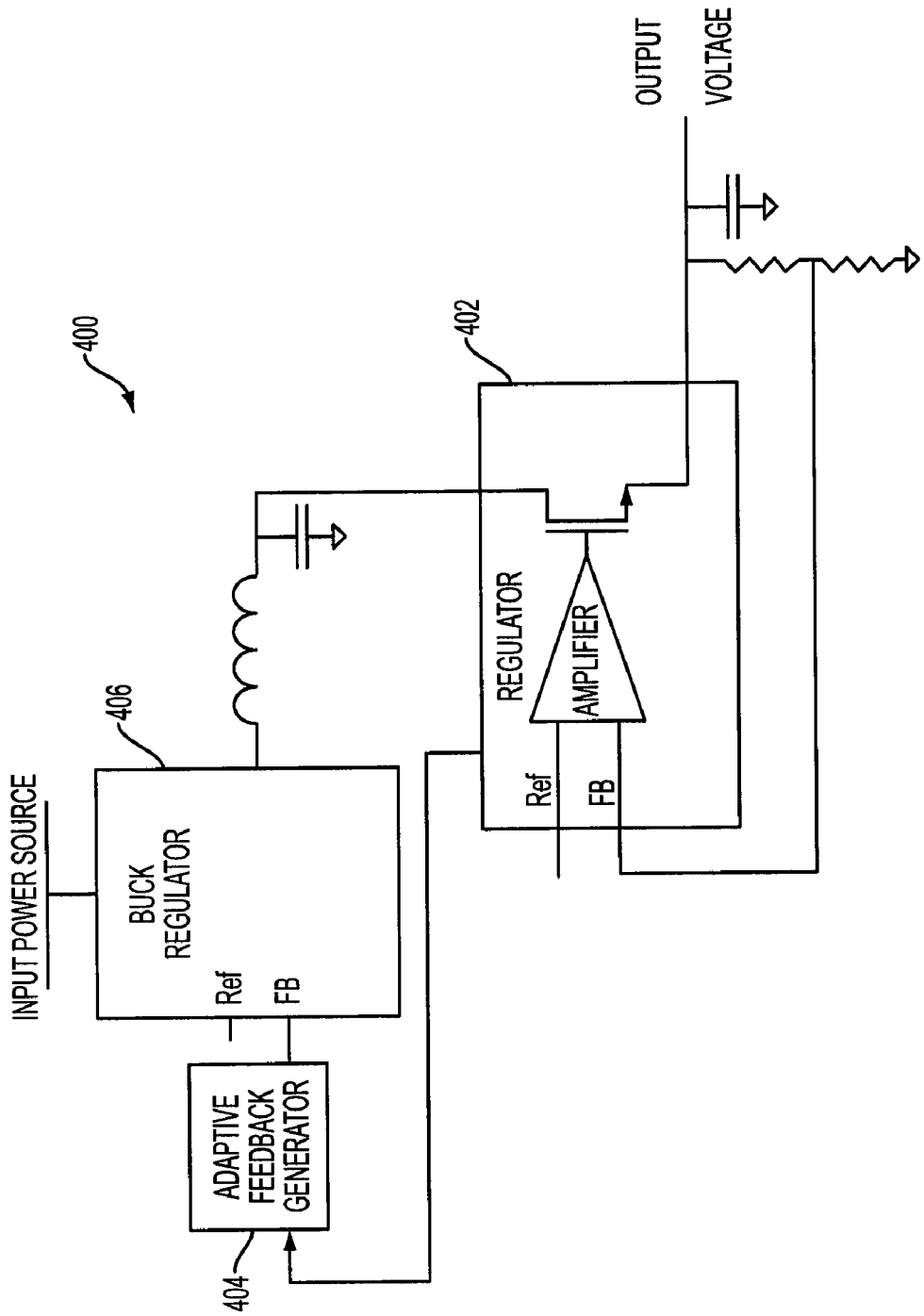

FIGS. 2-4 illustrate various implementations of a power supply system according to the present disclosure. FIG. 2 illustrates an exemplary power supply system 200 configured to operate a regulator at an optimum efficiency for a given degree of isolation. The power supply system 200 includes a regulator 202 and a controller 204. The regulator 202 may include a linear regulator such as, for example, a LDO. Regardless, regulator 202 is configured to receive an input voltage from controller 204 and to produce an output voltage. To this end, regulator 202 includes, among other features, an output device 202a coupled to an input node 202b and an output node 202c.

In one example, the output device 202a includes a FET including a drain, a gate, and a source. The drain is coupled to input node 202b and the source is coupled to the output node 202c.

The input node 202b couples regulator 202 to controller 204. The controller 204 is configured to monitor at least one operating parameter of output device 202a and, in response, generate a control signal that adjusts the input voltage, received at input node 202b, to a minimum input voltage needed to maintain output device 202a in saturation regardless of variation in the monitored operating parameter. Maintaining the output device 202a in saturation may include maintaining a bias condition of output device 202a in saturation for a desired isolation regardless of variations in the monitored operating parameter. The desired isolation may include a degree into which the output device should be driven into saturation. For example, when the desired isolation is set for 150 mV, the controller maintain the bias condition of output device 202a such that output device 202a is 150 mV into saturation regardless of operating condition of output device 202a.

To this end, controller 204 includes an input node 204a and an output node 204b. In one implementation, controller 204 receives one or more input signals at its input node 204a, calculates, based on the received one or more input signals, a minimum value of the input voltage required for operating output device 202a in saturation, and accordingly adjusts the bias of output device 202a by producing the needed minimum value input voltage (e.g., an output FET bias voltage delivered as the drain voltage 202b) at its output node 204b. The operating parameter may include a threshold voltage and/or a gate-to-source voltage of output device 202a. The controller and it operation are described below in more detail with respect to FIG. 5.

FIGS. 3 and 4 illustrate other implementations of the power supply system according to the present disclosure. In particular, FIG. 3 illustrates an exemplary power supply system 300 including a regulator 302, an adaptive feedback generator 304, and a driving regulator 306. FIG. 4 illustrates an exemplary power supply system 400 including a regulator 402, an adaptive feedback generator 404, and a buck regulator 406. As shown, with the exception of buck regulator 406, power supply system 400 is generally similar to power supply system 300. Therefore for the sake of simplicity and brevity of description, power supply system 300 is described in detail below and the redundant aspects of power supply system 400 are not described.

As noted-above, power supply system 300 includes regulator 302, adaptive feedback generator 304, and driving regulator 306. The regulator 302 is generally similar to regulator 202, and therefore it is not described here in more detail. The adaptive feedback generator 304 is configured to monitor the operating parameters of regulator 302 and to adjust the feedback signal received by driving regulator 306, thereby ensuring the output voltage of driving regulator 306 is set to optimize efficiency of output device 302a for a given degree of isolation.

As such, adaptive feedback generator 304 is generally similar to controller 204 in a sense that it is configured to monitor at least one operating parameter of regulator 302 and to control the input voltage applied to output device 302a. To do so, however and in contrast to controller 204, which directly provides the input voltage to regulator 202, adaptive feedback generator 304 generates a feedback signal that is received by driving regulator 306. Based on the received feedback signal, driving regulator 306 produces an output voltage (e.g., output FET bias voltage delivered as the drain voltage 306c) received by regulator 302. The circuit configuration of adaptive feedback generator 304 and how the feedback signal is generated is described in more detail below with respect to FIG. 5.

The driving regulator 306 includes a feedback signal node 306a, a reference voltage node 306b, and an output node 306c. The feedback signal node 306a is configured to receive the feedback signal generated by adaptive feedback generator 304. The reference voltage node 306b is configured to receive a reference voltage for driving regulator 306. The reference voltage 306b is implementation specific and may vary from one implementation to another. In one implementation, the driving regulator 306 increases or decreases output voltage produced at output node 306c such that the closed loop system drives feedback voltage received, from adaptive feedback generator 304 and at input node 306a, to the same voltage as the reference voltage. The driving regulator 306 receives the feedback voltage and the reference voltage and outputs FET bias voltage at the output node 306c.

FIG. 4 illustrates an exemplary power supply system 400 that employs a switching regulator as a driving regulator. As shown, the switching regulator includes a buck regulator 406. The buck regulator 406 is configured to provide voltage reduction from an input power source. In particular, in one implementation, regulator 402 is used in an environment in which there should be a small difference between the regulator's 402 received input voltage and produced output voltage. This may be one reason for inserting buck regulator 406 between the input power source and regulator 402.

Figure 5:
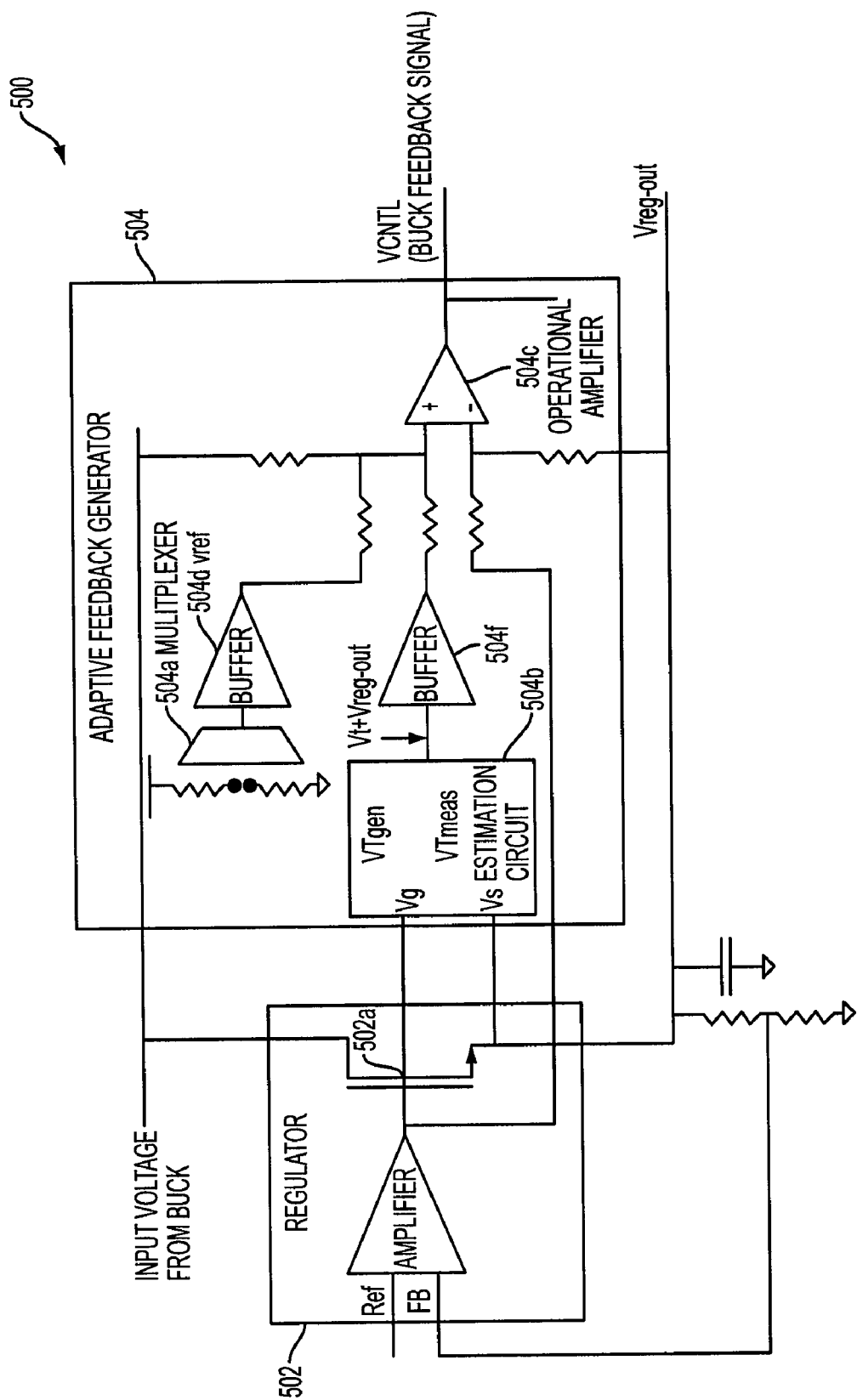
FIG. 5 illustrates an exemplary power supply system that shows in more detail a circuit configuration of an adaptive feedback generator.

FIG. 5 illustrates a power supply system 500 showing in more detail a circuit configuration of an adaptive feedback generator 504. The power supply system 500 includes a regulator 502 (e.g., LDO), an adaptive feedback generator 504, and a buck regulator (not shown). The regulator 502, adaptive feedback generator 504, and the buck regulator are similar to regulator 402, adaptive feedback generator 404, and buck regulator 406, respectively. Therefore, for the sake of simplicity and brevity of description, regulator 502 and the buck regulator are not described in detail. The adaptive feedback generator 504, however, is detailed below.

The adaptive feedback generator 504 is configured to monitor operating parameters of regulator 502 and to drive an appropriate feedback signal to the buck regulator, thereby ensuring that an input voltage to regulator 502 provides for an optimum efficiency for a given degree of isolation. The adaptive feedback generator 504 includes a multiplexer 504a, an estimation circuit 504b, and an operational amplifier 504c. The multiplexer 504a is configured to generate a programmable reference voltage (shown as $V_{ref}$), which is provided to operational amplifier 504c through a buffer 504d. The estimation circuit 504b is configured to estimate a threshold voltage ("$V_t$") of FET output device 502a superimposed on the source voltage of FET output device 502a. This signal is then buffered by block 504f as necessary and provided to operational amplifier 504c.

The operational amplifier 504c acts as a summing amplifier combining the terms of interest to produce the appropriate feedback signal (shown as $V_{CNTL}$). In particular, operational amplifier 504c is configured to receive, at one input, programmable reference voltage from multiplexer 504a, voltage produced by estimation circuit 504b (shown as $V_t+V_{reg-out}$), and the output voltage produced by the buck regulator (e.g., the drain voltage of FET output device 502a) and to receive, at another input, the source voltage of FET output device 502a (shown as $V_{reg-out}$) and the gate voltage of FET output device 502a. The operational amplifier 504c is further configured to aggregate the voltage signals received at its inputs and generate the feedback signal for controlling the output voltage produced by the buck regulator and received by FET output device 502a.

To illustrate, the feedback signal may be written as follows:

$$\begin{aligned} V_{CNTL} &= V_{ref} + V_d + (V_t + V_{reg-out}) - V_g - V_{reg-out} \quad \text{(Equation 2)} \\ &= V_{ref} + (V_d - V_{reg-out}) - (V_g - V_{reg-out} - V_t) \\ &= V_{ref} + (V_d - V_{reg-out}) - (V_{gs} - V_t) \\ &= V_{ref} + V_{ds} - (V_{gs} - V_t) \end{aligned}$$

where, $V_d$ represents a drain voltage of FET output device 502a, $V_g$ represents a gate voltage of FET output device 502a, $V_t$ represents a threshold voltage of FET output device 502a, $V_{ds}$ represented a drain-to-source voltage of FET output device 502a, and $V_{gs}$ represents a gate-to-source voltage of FET output device 502a.

From Equation 2, it can be seen that the feedback signal is equal to the difference between $V_{ds}$ and the quantity $V_{gs}-V_t$ superimposed upon a programmable offset voltage $V_{ref}$. The loop formed by the buck regulator will then drive the $V_{ds}$ of FET output device 502a such that the feedback signal equals that of the buck reference voltage ("$V_{buck\_ref}$"). Therefore, the loop formed by the driving regulator will adjust $V_{ds}$ such that:

$$V_{ds}=(V_{buck\_ref}-V_{ref})+(V_{gs}-V_t) \quad \text{(Equation 3)}$$

Equation 3 states that $V_{ds}$ may be set to the minimum value required for saturation ($V_{ds}=V_{gs}-V_t$) plus some constant offset ($V_{buck\_ref}-V_{ref}$). This offset term may be adjusted by adjusting $V_{ref}$ to place FET output device 502a operation as far into saturation (or out of saturation) as desired. For example, if the buck regulator has $V_{buck\_ref}$ of 0.8v and feedback generator 504 has $V_{ref}$ of 0.7v, the loop will force $V_{ds}=(V_{gs}-V_t)+0.1v$. Therefore, FET output device 502a will be operating 0.1v into saturation.

In one implementation, power supply system 500 is designed such that the loop actively adjusts $V_{ds}$ to maintain this setting regardless of load current, output voltage, temperature, and process variation thereby maintaining the desired isolation (obtained at 0.1v into saturation) with the high efficiency. The high efficiency results from the lack of need to bias $V_{ds}$ farther into saturation just to ensure that over all load current, output voltage, temperature, and process variations $V_{ds}$ remains at least equal to $(V_{gs}-V_t)+0.1$ v for the isolation required. For the case where $V_{ref}$ is set equal to $V_{buck\_ref}$, the loop will then ensure $V_{ds}=V_{gs}-V_t$ over all conditions to yield FET output device 502a that has the minimum required $V_{ds}$ for saturation yielding maximum efficiency.

Figure 6A:
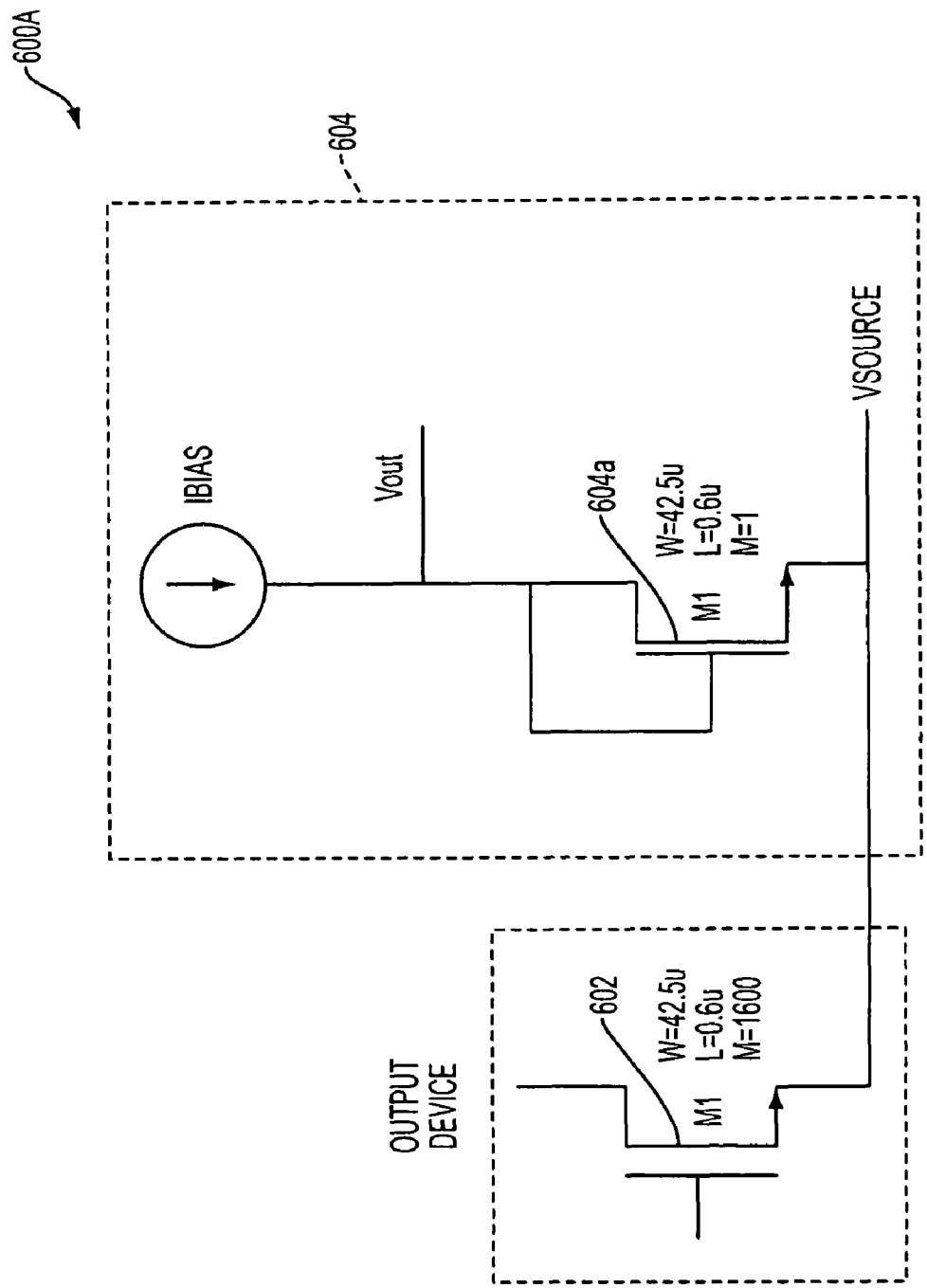
FIGS. 6A, 6B, and 7 illustrate various exemplary circuit configurations, each showing in more detail an estimation circuit that is coupled to a FET output device and that is configured to estimate a threshold voltage of the FET output device.
Figure 6B:
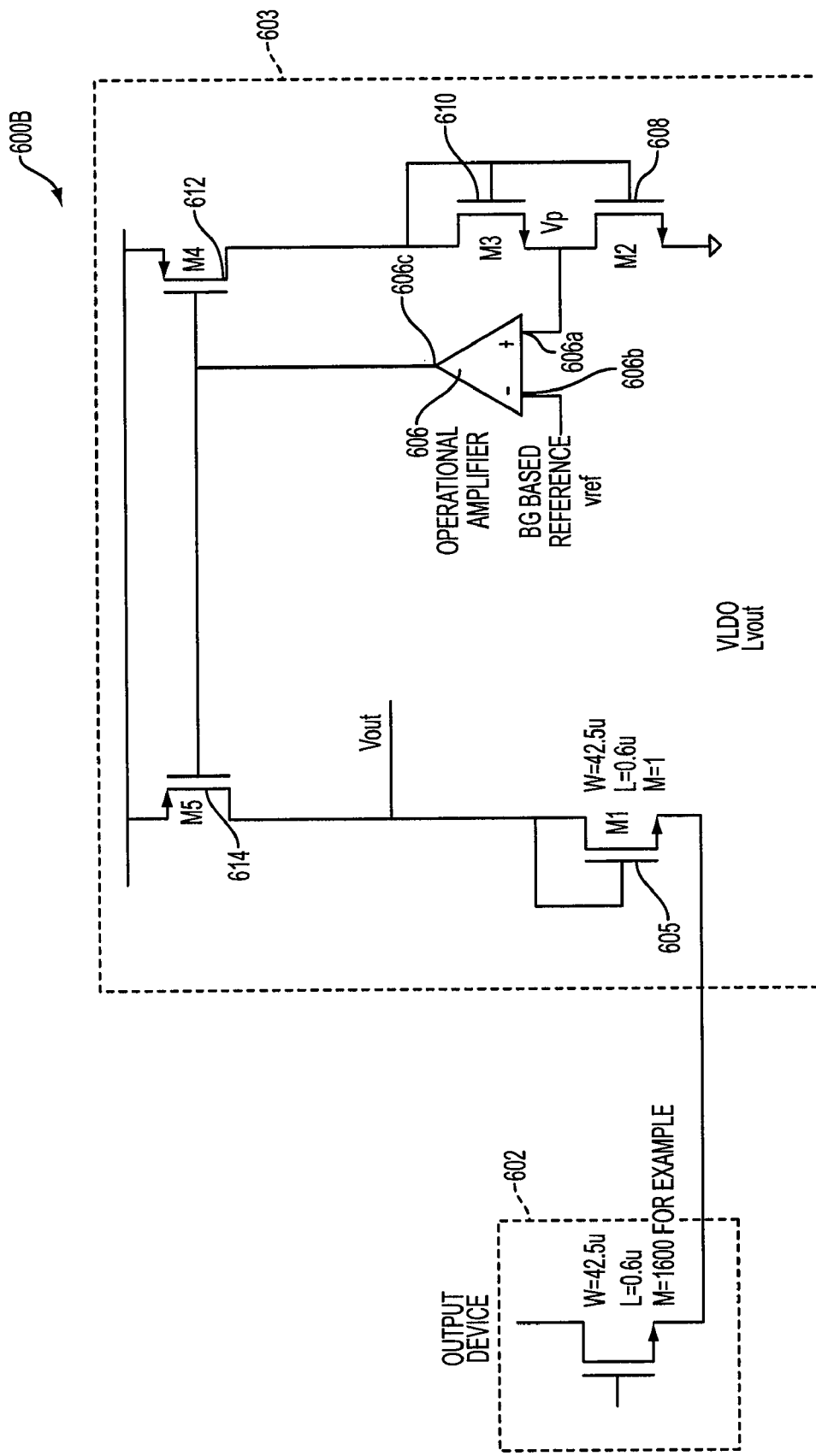
Figure 7:
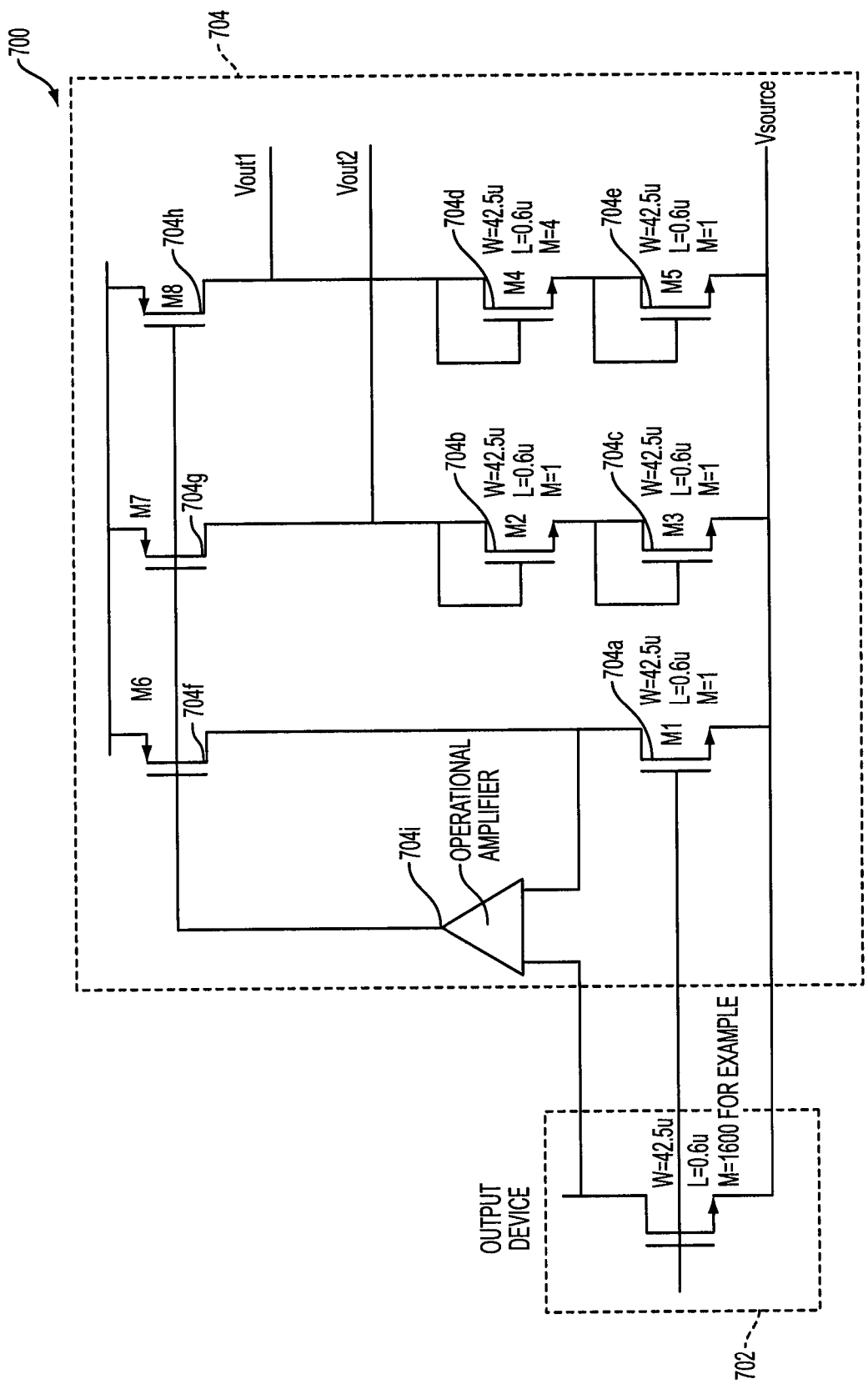

As noted above, adaptive feedback generator 504 includes estimation circuit 504b configured to estimate a threshold voltage of FET output device 502a superimposed on the source voltage of FET output device 502a (shown as $V_t+V_{reg\text{-}out}$). FIGS. 6A, 6B, and 7 illustrate various exemplary circuit configuration for an estimation circuit that is coupled to a FET output device and that is configured to reduce the variations in the estimated threshold voltage of the FET output device.

FIG. 6A illustrates an exemplary circuit configuration 600A showing in more detail an estimation circuit that is coupled to a FET output device and that is configured to estimate a threshold voltage of the FET output device. The circuit configuration 600A includes a FET output device 602 and an estimation circuit 604.

The FET output device 602 is similar to FET output device 502 illustrated by FIG. 5, and therefore, it is not described here in more detail. The estimation circuit 604 includes a semiconductor device 604a (shown as M1) coupled to FET output device 602 and configured to estimate a threshold voltage of FET output device 602 based on its output voltage. Although, in the foregoing implementation, semiconductor device 604a is used to estimate a threshold voltage (or $V_t+V_{source}$, if desired) of FET output device 602, it should be noted that it can be used to generate these terms for other target devices.

Regardless, semiconductor device 604a includes a gate, a drain, and a source. The gate is coupled to the drain, defining the output voltage of semiconductor device 604a. The source is coupled to the source of FET output device 602. In one example, M=N indicates N times a unit device w/l ratio. For instance, M=1 indicates a single device of a give size (e.g., a single device of w=42.5 um and l=0.6 um), whereas M=4 indicates a device comprised of four unit devices. Alternatively, M=4 may indicate a signal device with w/l ratio 4 times a device with M=1 or any combination thereof that results in 4 times an M=1 device w/l. In one implementation, multiple M1 devices (M>1) placed around or within output device 602 may further reduce random error between M1 and output device over process variations. In one implementation, the current and device sizing places M1 into weak inversion.

As noted-above, the estimation circuit 604 also produces the $V_{source}$ term for the target device as well, which can be easily subtracted with a following operational amplifier stage if the threshold voltage only is desired. Generally, for a FET output device operating in the saturation region, the current through the device can be related to its bias voltage by:

$$I=0.5*u*C_{ox}*(w/l)*(V_{gs}-V_t)^2 \quad \text{(Equation 4)}$$

where, I represents the current through FET output device 602, u represents the mobility, $C_{ox}$ represents the capacitance per area of the gate oxide of FET output device 602, w represents the gate width of FET output device 602, l represents the gate length of FET output device 602, $V_{gs}$ represents a gate-to-source voltage of FET output device 602, and $V_t$ represents a threshold voltage of FET output device. Solving this equation for $V_g$ gives:

$$V_g=V_{source}+V_t+\text{sqrt}((2*I)/(u*C_{ox}*(w/l))) \quad \text{(Equation 5)}$$

Applying Equation 5 to FIG. 6A while noting $V_g=V_{out}$ gives the output voltage of M1 as follows:

$$V_{out}=V_{source}+V_{t1}+\text{sqrt}((2*I)/(u*C_{ox}*(w/l))) \quad \text{(Equation 6)}$$

where, $V_{t1}$ represents a threshold voltage of M1 and tracks the threshold voltage of FET output device 602 over temperature, output voltage, and process. Therefore, Equation 6 can be rewritten as follows:

$$V_{out}\approx V_{source}+V_t+\text{sqrt}((2*I)/(u*C_{ox}*(w/l))) \quad \text{(Equation 7)}$$

As noted in Equation 7, the output voltage is equal to the source voltage plus the threshold voltage of FET output device 602 plus an additional offset term. The semiconductor device M1 is such that the current to w/l ratio of semiconductor device M1 is small, thus the additional offset term is also small. However, this additional offset term varies over temperature and process, which may be undesirable.

FIG. 6B illustrates another exemplary circuit configuration 600B showing in more detail an estimation circuit that is coupled to a FET output device and that is configured to estimate a threshold voltage of the FET output device having reduced variations. The circuit configuration 600B includes a FET output device 602 and an estimation circuit 603. The FET output device 602 is similar to FET output device 502 illustrated by FIG. 5, and therefore, it is not described in detail.

The estimation circuit 603 is similar to estimation circuit 604 illustrated by FIG. 6A and includes a semiconductor device 605 (shown as M1) coupled to FET output device 602. However and in contrast to estimation circuit 604, estimation circuit 603 also includes a feedback circuit configured to reduce variations in a estimated threshold voltage of FET output device 602. The feedback circuit includes an operational amplifier 606 (shown as U1) and semiconductor devices 608, 610, 612, and 614 (shown as M2, M3, M4, and M5, respectively). For ease of reference and consistency with the below-reproduced equations, semiconductor devices 605, 608, 610, 612, and 614 will be referenced in the text as semiconductor devices M1-M5, respectively.

The operational amplifier 606 is configured to adjust the current in semiconductor device M1, thereby reducing the variations in the additional offset term associated with a threshold voltage of FET output device 602 (discussed above with respect to FIG. 6A) to a negligible amount. To this end, operational amplifier 606 includes a first input node 606a for receiving signal corresponding to effects that influences semiconductor device M1, a second input node 606b for receiving a reference signal, and an output node 606c for controlling the output signal of semiconductor device M1.

The first input node 606a is configured to receive voltage signal (shows as $V_P$) produced by semiconductor devices M2 and M3. $V_P$ may be defined by the following equation:

$$V_P=V_{gs,M2}-V_{gs,M3} \quad \text{(Equation 8)}$$

where, $V_{gs,M2}$ represents a gate-to-source voltage of semiconductor device M2 and $V_{gs,M3}$ represents a gate-to-source voltage of semiconductor device M3.

In one implementation, width/length of semiconductor device M3 is made large given the bias current through the device, and therefore $V_{gs,M3}$ will approximately equal the threshold voltage of semiconductor device M3. As such and noting the relationship of the current through a FET device to its bias voltage, Equation 8 may be rewritten as follows:

$$V_P = V_{t,M2} + \text{sqrt}((2*I)/(u*C_{ox}*(w/l))) - V_{t,M3} \quad \text{(Equation 9)}$$

where, $V_{t,M3}$ represents a threshold voltage associated with semiconductor device M3. As shown by Equation 9, $V_P$ has a constant term due to the threshold differences in semiconductor devices M2, M3 and a result of the body effect of these devices.

Moving forward, second input node 606b is configured to receive a band gap reference voltage (shown as $V_{ref}$) or another voltage that has minimal variation over temperature and supply changes. The operational amplifier 606 will act to force the voltage at its positive terminal as follows:

$$V_P = V_{ref} \approx V_{t,M2} + \text{sqrt}((2*I)/(u*C_{ox}*(w/l))) - V_{t,M3} \quad \text{(Equation 10)}$$

Therefore and as shown by Equation 10, operational amplifier 606 forces the current in semiconductor devices M2-M4 to a constant value plus an adjustment for process and temperature variations to maintain the requisite constant voltage at $V_P$. The resultant current is then used by semiconductor device M5 to reduce the variations of the additional small offset term in semiconductor device M1 to a negligible amount. Since the source of semiconductor device M1 is tied to the source of FET output device 602, threshold voltage variations of FET output device 602 due to the body effect will also be seen by semiconductor device M1 and thus be accurately represented in the output voltage as well.

Accordingly, the output voltage (shown as $V_{out}$) accurately represents the threshold voltage of FET output device 602 plus the source voltage of FET output device 602. If the threshold voltage only is desired, a subsequent operational amplifier loop may be used to subtract the source voltage and to yield the threshold voltage alone.

Along these lines, it should be noted that standard analog matching techniques can further enhance the accuracy of estimation circuits 600A, 600B by accurately matching semiconductor device M1 to the target device (e.g., FET output device 602). For example, ideally, semiconductor device M1 may be constructed of one or more unit devices from the target device to accurately match process variations and other effects such as drain induced barrier lowering (DIBL). Further, ideally, semiconductor device M1 may be centrally located within the target device, or if multiple devices are used for semiconductor device M1, these multiple devices would be placed in a common-centroid fashion within the target device. This placement of semiconductor device M1 within the target device enhances the temperature and process matching of semiconductor device M1 to the target device.

FIG. 7 illustrates another exemplary circuit configuration 700 showing in more detail an estimation circuit that is coupled to a FET output device and that is configured to estimate a threshold voltage of the FET output device having reduced variations. The circuit configuration 700 includes a FET output device 702 and an estimation circuit 704. The FET output device 702 is similar to FET output device 502 illustrated by FIG. 5, and therefore, it is not described in detail.

The estimation circuit 704 is configured to estimate a threshold voltage of FET output device 702 or estimate a $V_{gs} - V_t$ if desired. It should be noted, however, that estimation circuit 704 may be used to estimate these terms for other target devices if so desired. Regardless, estimation circuit 704 includes semiconductor devices 704a-704h (shown as M1-M8) and operational amplifier 704i. The operational amplifier 707i, in one implementation, ensures the current in semiconductor device M1 is proportional to that of FET output device 702. Further, the current in semiconductor devices M6-M8 will be equal. The estimation circuit 704 produces two output voltages (shown as $V_{out1}$ and $V_{out2}$). $V_{out1}$ is taken at the drain node of semiconductor device M8 and is defined as follows:

$$V_{out1} = V_{gs,M5} + V_{gs,M4} + V_{source} \quad \text{(Equation 11)}$$

where, $V_{gs,M5}$ represents a gate-to-source voltage of semiconductor device M5, $V_{gs,M4}$ represents a gate-to-source voltage of semiconductor device M4, and $V_{source}$ represents a source voltage of semiconductor device M8. Referring again to Equation 5, Equation 11 may be rewritten as follows:

$$V_{out1} = V_{t,M5} + \text{sqrt}(2*I/k) + V_{t,M4} + \text{sqrt}(2*I/k) + V_{source} \quad \text{(Equation 12)}$$

where, $V_{t,M5}$ represents a threshold voltage of semiconductor device M5, $V_{t,M4}$ represents a threshold voltage of semiconductor device M4, I represents a current flowing in the device, and k is a constant equal to the mobility*oxide capacitance*(w/l) for the device.

Noting semiconductor devices M4, M5 are four times larger than semiconductor device M1 (since M=4 for semiconductor devices M4, M5 and M=1 for semiconductor device M1), Equation 12 can be rewritten as follows:

$$V_{out1} = V_{t,M5} + 0.5\ V_{gs,M1} - 0.5\ V_{t,M1} + V_{t,M4} + 0.5\ V_{gs,M1} - 0.5 V_{t,M1} + V_{source} \quad \text{(Equation 13)}$$

where, $V_{gs,M1}$ represents a gate-to-source voltage of semiconductor device M1, and $V_{t,M1}$ represents a threshold voltage of semiconductor device M1. Since the threshold of semiconductor device M5 matches that of semiconductor device M1, Equation 13 may be rewritten as follows:

$$V_{out1} = V_{gs,M1} + V_{t,M4} + V_{source} \quad \text{(Equation 14)}$$

Turning now to $V_{out2}$, it may be defined as follows:

$$V_{out2} = V_{gs,M2} + V_{gs,M3} + V_{source} \quad \text{(Equation 15)}$$

where, $V_{gs,M2}$ represents a gate-to-source voltage of semiconductor device M2, $V_{gs,M3}$ represents a gate-to-source voltage of semiconductor device M3, and $V_{source}$ represents a source voltage of semiconductor device M7. Referring again to Equation 5, Equation 15 may be rewritten as follows:

$$V_{out2} = V_{t,M3} + \text{sqrt}(2*I/k) + V_{t,m2} + \text{sqrt}(2*I/k) + V_{source} \quad \text{(Equation 16)}$$

where, $V_{t,M2}$ represents a threshold voltage of semiconductor device M2. Noting M2 and M3 are of the same size as M1 (since M=1 for M1, M2, and M3), Equation 16 may be rewritten as follows:

$$V_{out2} = V_{t,M3} + V_{gs,M1} - V_{t,M1} + V_{t,M2} + V_{gs,M1} - V_{t,M1} + V_{source} \quad \text{(Equation 17)}$$

Since the threshold of M3 matches that of M1, Equation 17 may be rewritten as follows:

$$V_{out2} = 2*V_{gs,M1} + V_{t,M2} - V_{t,M1} + V_{source} \quad \text{(Equation 18)}$$

Furthermore, because the threshold voltage of M2 matches that of M4, subtracting Equation 18 from Equation 14 leads to the following equation:

$$V_{out2} - V_{out1} = V_{gs,M1} - V_{t,M1} \quad \text{(Equation 19)}$$

Equation 19 yields an accurate estimate of a threshold of FET output device 702. As noted by Equation 19, estimation circuit 704 also produces $V_{gs}$ term for FET output device 702 as well, which can be subtracted with a following operational amplifier stage if the threshold voltage is only desired.

Figure 8:
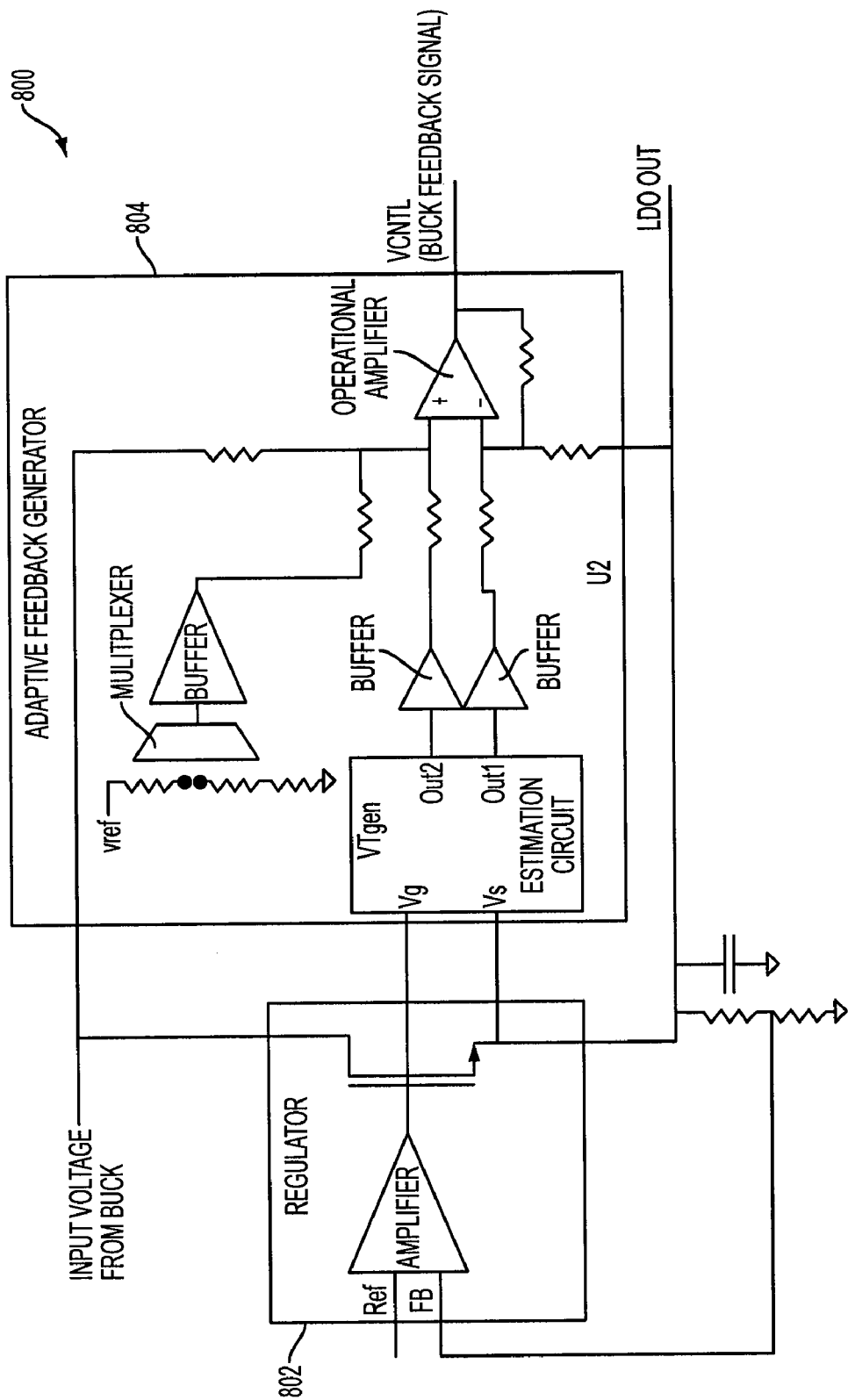
FIG. 8 illustrates an exemplary power supply system that shows in more detail a circuit configuration of an adaptive feedback generator.

FIG. 8 illustrates a power supply system 800 showing details of a circuit configuration of an adaptive feedback generator that employs an estimation circuit 704. The power supply system 800 includes a regulator 802 (e.g., LDO), an adaptive feedback generator 804, and a buck regulator (not shown). The regulator 802 and the buck regulator are similar to regulator 502 and the buck regulator described with respect to FIG. 5, and therefore, they are not described in detail.

The adaptive feedback generator 804 is generally similar to adaptive feedback generator 504. However and in contrast to adaptive feedback generator 504, adaptive feedback generator 804 employs as its estimation circuit a circuit 704 illustrated by FIG. 7. To this end, adaptive feedback generator 804 includes a buffer U8 for the signal $V_{out1}$ if desired. Other implementations are contemplated. For one example, although the output device is described as an N-FET, it can be a P-FET output device or a bipolar output device. In another example, although the aforementioned description describes a controller that is configured to maintain the output device into saturation regardless of variations in the operating parameters of the output device, the controller may more specifically be configured to maintain a bias condition of the output device in the saturation to achieve a desired isolation regardless of variations in the monitored operating parameter. The desired isolation may include a degree into which the output device should be driven into saturation. Other implementations are also contemplated.

What is claimed is:

1. A power supply system comprising:
   a regulator for receiving an input voltage and producing an output voltage, the regulator including an output device; and
   a controller coupled to the regulator and configured to monitor at least one operating parameter of the output device and, in response, generate a control signal that adjusts the input voltage to a minimum input voltage needed to maintain the output device in saturation regardless of variation in the monitored operating parameter,
   wherein maintaining the output device in saturation regardless of variation in the monitored operating parameter includes maintaining a bias condition of the output device in the saturation to achieve a desired isolation regardless of variations in the monitored operating parameter.

2. The power supply system of claim 1, wherein the output device includes a field-effect transistor ("FET") including a drain, a gate, and a source.

3. The power supply system of claim 1, wherein the controller includes an adaptive feedback generator configured to control, via a feedback signal, the input voltage applied to the output device.

4. The power supply system of claim 3, wherein:
   the output device includes an FET having a drain, a source, and a gate; and
   the adaptive feedback generator is configured to control the input voltage applied to the drain of the FET, thereby controlling the drain voltage.

5. The power supply system of claim 4, wherein the adaptive feedback generator includes:
   an estimating circuit configured to estimate a threshold voltage associated with the FET; and
   an operational amplifier configured to aggregate the estimated threshold voltage associated with the FET and a reference voltage associated with the feedback generator and to produce the feedback signal that controls the input voltage received by the FET.

6. The power supply system of claim 5, further comprising a driving regulator coupled to the regulator and the adaptive feedback generator, the driving regulator configured to be responsive to the feedback generator in providing the input voltage received by the FET.

7. The power supply system of claim 6, wherein the driving regulator is configured to be responsive to the feedback signal.

8. The power supply system of claim 6, wherein the driving regulator includes a switching regulator configured to provide voltage reduction from an input power source.

9. The power supply system of claim 7, wherein the feedback signal ("FS")=$(V_{ref})+V_{ds}-(V_{gs}-V_t)$, wherein:
   $V_{ref}$=the reference voltage;
   $V_{ds}$=the drain voltage ($V_d$)–the source voltage ($V_s$);
   $V_{gs}$=the gate voltage ($V_g$)–the source voltage ($V_s$); and
   $V_t$=the threshold voltage.

10. The power supply system of claim 8, wherein the switching regulator includes a buck regulator.

11. The power supply system of claim 9, wherein the driving regulator is configured to drive $V_{ds}$ such that a reference voltage of the driving regulator ($V_{reg-ref}$) relatively equals the feedback signal.

12. The power supply system of claim 11, wherein the driving regulator is configured to maintain a $V_{ds}(V_{reg-ref}-V_{ref})+(V_{gs}-V_t)$ regardless of a load current, output voltage, temperate and/or variation in the threshold voltage associated with the FET.

13. The power supply system of claim 3, wherein the adaptive feedback generator includes an estimation circuit that includes a semiconductor device, the estimation circuit configured to estimate a voltage at the output device based on an output signal of the semiconductor device.

14. The power supply system of claim 13, wherein the estimation circuit is configured to estimate a threshold voltage of the output device.

15. The power supply system of claim 14, wherein the estimation circuit further includes a feedback circuit coupled to the output signal of the semiconductor device, the feedback circuit configured to reduce variations in the estimated threshold voltage of the output device.

16. The power supply system of claim 15, wherein the feedback circuit includes an operational amplifier having a first input for receiving a signal corresponding to effects that influence the semiconductor device, a second input for receiving a reference signal, and an output for controlling the output signal of the semiconductor device.

17. The power supply system of claim 3, wherein the feedback generator includes an estimation circuit that includes a first circuit including a first combination of semiconductor devices and a second circuit including a second combination of semiconductor devices, the estimation circuit configured to estimate a threshold voltage of the output device.

18. The power supply system of claim 17, wherein the first circuit is configured to produce a first output signal and the second circuit is configured to produce a second output signal, wherein the difference between the first output signal and the second output signal corresponds to the estimated threshold voltage of the output device.

19. The power supply system of claim 1, wherein the regulator includes a linear regulator.

20. The power supply system of claim 19, wherein the linear regulator includes a low dropout regulator.

21. The power supply system of claim 1, wherein the desired isolation includes a degree into which the output device should be driven into saturation.

22. A method for supplying power, the method comprising:
monitoring at least one operating parameter of an output device of a regulator configured to receive an input voltage and produce an output voltage;
determining, based on the monitored operating parameter, a minimum value of the input voltage required to maintain the output device in saturation; and
generating a control signal that adjusts the input voltage of the regulator to the determined minimum value in order to maintain the output device in saturation regardless of variation in the monitored operating parameter,
wherein maintaining the output device in saturation regardless of variation in the monitored operating parameter includes maintaining a bias condition of the output device in the saturation to achieve a desired isolation regardless of variations in the monitored operating parameter.

23. The method of claim 22, wherein the regulator includes a linear regulator.

24. The method of claim 23, wherein the linear regulator includes a low dropout regulator.

25. The method of claim 23, further comprising
submitting the control signal to a driving regulator configured to produce the input voltage having the determined minimum value.

26. The method of claim 22, wherein the output device includes a field-effect transistor ("FET") including a drain, a gate, and a source.

27. The method of claim 26, wherein monitoring the at least one operating parameter includes monitoring a threshold voltage ("$V_t$") of the FET and/or a gate-to-source voltage ("$V_{gs}$") of the FET.

28. The method of claim 27, wherein monitoring $V_t$ and/or $V_{gs}$ includes tracking variation of $V_t$ and/or $V_{gs}$ due to temperature, process variation, output voltage or load current of the FET.

29. The method of claim 27, wherein determining the minimum value of the input voltage required for operating the output device in saturation includes aggregating $V_t$ and $V_{gs}$ to determine the minimum value of the input voltage.

30. The method of claim 29, wherein aggregating $V_t$ and $V_{gs}$ includes subtracting $V_t$ from $V_{gs}$ to determine the minimum value of drain-to-source voltage ("$V_{ds}$").

31. The method of claim 22, wherein the desired isolation includes a degree into which the FET should be driven into saturation.

32. A controller, coupled to a regulator having an output device, and configured to monitor at least one operating parameter of the output device and, in response, provide a control signal for controlling an input voltage received by the output device, the controller comprising:
a multiplexer configured to generate a programmable reference voltage;
an estimation circuit configured to estimate a threshold voltage of the output device superimposed on a source voltage of the output device; and
an operational amplifier configured to:
receive, at one input, the programmable reference voltage from the multiplexer and the estimated threshold voltage from the estimation circuit;
receive, at another input, the source voltage, the drain voltage, and the gate voltage of the output device;
aggregate the voltages received at its inputs; and
generate a control signal to adjust the input voltage to a minimum input voltage needed to maintain the output device in saturation regardless of variations in operating parameters of the output device.

33. A power supply system comprising:
a regulator for receiving an input voltage and producing an output voltage, the regulator including an output device; and
a controller coupled to the regulator and configured to monitor at least one operating parameter of the output device and, in response, generate a control signal that adjusts the input voltage to a minimum input voltage needed to maintain the output device in saturation regardless of variation in the monitored operating parameter, wherein:
the controller includes an adaptive feedback generator configured to control, via a feedback signal, the input voltage applied to the output device, and
the feedback generator includes an estimation circuit that includes a first circuit including a first combination of semiconductor devices and a second circuit including a second combination of semiconductor devices, the estimation circuit configured to estimate a threshold voltage of the output device.

34. The power supply system of claim 33, wherein the output device includes a field-effect transistor ("FET") including a drain, a gate, and a source.

35. The power supply system of claim 33, wherein:
the output device includes an FET having a drain, a source, and a gate; and
the adaptive feedback generator is configured to control the input voltage applied to the drain of the FET, thereby controlling the drain voltage.

36. The power supply system of claim 35, wherein the adaptive feedback generator further includes an operational amplifier configured to aggregate the estimated threshold voltage associated with the FET and a reference voltage associated with the feedback generator and to produce the feedback signal that controls the input voltage received by the FET.

37. The power supply system of claim 36, further comprising a driving regulator coupled to the regulator and the adaptive feedback generator, the driving regulator configured to be responsive to the feedback generator in providing the input voltage received by the FET.

38. The power supply system of claim 37, wherein the driving regulator is configured to be responsive to the feedback signal.

39. The power supply system of claim 37, wherein the driving regulator includes a switching regulator configured to provide voltage reduction from an input power source.

40. The power supply system of claim 38, wherein the feedback signal ("FS")=$V_{ref}+V_{ds}-(V_{gs}-V_t)$, wherein:
$V_{ref}$=the reference voltage;
$V_{ds}$=the drain voltage ($V_d$)−the source voltage ($V_s$);
$V_{gs}$=the gate voltage ($V_g$)−the source voltage ($V_s$); and
$V_t$=the threshold voltage.

41. The power supply system of claim 39, wherein the switching regulator includes a buck regulator.

42. The power supply system of claim 40, wherein the driving regulator is configured to drive $V_{ds}$ such that a reference voltage of the driving regulator ($V_{reg-ref}$) relatively equals the feedback signal.

43. The power supply system of claim 42, wherein the driving regulator is configured to maintain a $V_{ds}=(V_{reg-ref}-V_{ref})+(V_{gs}-V_t)$ regardless of a load current, output voltage, temperate and/or variation in the threshold voltage associated with the FET.

44. The power supply system of claim 33, wherein the regulator includes a linear regulator.

45. The power supply system of claim 44, wherein the linear regulator includes a low dropout regulator.

46. The power supply system of claim 33, wherein the first circuit is configured to produce a first output signal and the second circuit is configured to produce a second output signal, wherein the difference between the first output signal and the second output signal corresponds to the estimated threshold voltage of the output device.

47. The power supply system of claim 33, wherein to maintain the output device in the saturation regardless of variation in the monitored operating parameter includes to maintain a bias condition of the output device in the saturation to achieve a desired isolation regardless of variations in the monitored operating parameter.

48. The power supply system of claim 47, wherein the desired isolation includes a degree into which the output device should be driven into saturation.

49. A power supply system comprising:
a regulator for receiving an input voltage and producing an output voltage, the regulator including an output device;
an adaptive feedback generator coupled to the regulator and configured to monitor at least one operating parameter of the output device and, in response, generate a control signal that adjusts the input voltage to a minimum input voltage needed to maintain the output device in saturation regardless of variation in the monitored operating parameter; and
a driving regulator coupled to the regulator and the adaptive feedback generator, wherein:
the output device includes an FET having a drain, a source, and a gate,
the adaptive feedback generator is configured to control, via a feedback signal, the input voltage applied to the drain of the FET, thereby controlling the drain voltage,
the adaptive feedback generator includes:
an estimating circuit configured to estimate a threshold voltage associated with the FET; and
an operational amplifier configured to aggregate the estimated threshold voltage associated with the FET and a reference voltage associated with the feedback generator and to produce the feedback signal that controls the input voltage received by the FET,
the driving regulator is configured to be responsive to the feedback signal in providing the input voltage received by the FET, and
the feedback signal ("FS")=$(V_{ref})+V_{ds}-(V_{gs}-V_t)$, wherein:
$V_{ref}$=the reference voltage;
$V_{ds}$=the drain voltage ($V_d$)–the source voltage ($V_s$);
$V_{gs}$=the gate voltage ($V_g$)–the source voltage ($V_s$); and
$V_t$=the threshold voltage.

50. The power supply system of claim 49, wherein the driving regulator is configured to drive $V_{ds}$ such that a reference voltage of the driving regulator ($V_{reg-ref}$) relatively equals the feedback signal.

51. The power supply system of claim 50, wherein the driving regulator is configured to maintain a $V_{ds}=(V_{reg-ref}-V_{ref})+(V_{gs}-V_t)$ regardless of a load current, output voltage, temperate and/or variation in the threshold voltage associated with the FET.

52. The power supply system of claim 49, wherein the driving regulator includes a switching regulator configured to provide voltage reduction from an input power source.

53. The power supply system of claim 52, wherein the switching regulator includes a buck regulator.

54. The power supply system of claim 49, wherein the regulator includes a linear regulator.

55. The power supply system of claim 54, wherein the linear regulator includes a low dropout regulator.

56. The power supply system of claim 49, wherein to maintain the output device in the saturation regardless of variation in the monitored operating parameter includes to maintain a bias condition of the output device in the saturation to achieve a desired isolation regardless of variations in the monitored operating parameter.

57. The power supply system of claim 56, wherein the desired isolation includes a degree into which the output device should be driven into saturation.

* * * * *

UNITED STATES PATENT AND TRADEMARK OFFICE
CERTIFICATE OF CORRECTION

| | | |
|---|---|---|
| PATENT NO. | : 7,834,600 B2 | Page 1 of 1 |
| APPLICATION NO. | : 12/000595 | |
| DATED | : November 16, 2010 | |
| INVENTOR(S) | : Keith N. Bassett | |

It is certified that error appears in the above-identified patent and that said Letters Patent is hereby corrected as shown below:

Title Page, Item (75) second Inventor should read

-- Ralph Edward ~~Anderson~~ Andersson, Nevada City, CA --.

Signed and Sealed this
Fourteenth Day of May, 2013

Teresa Stanek Rea
*Acting Director of the United States Patent and Trademark Office*